March 21, 1933. C. W. P. HEYLANDT Re. 18,774

TRANSFERRING LIQUEFIED GASES

Original Filed Feb. 9, 1929

INVENTOR

Christian Wilhelm Paul Heylandt

BY

Watson, Bristol, Johnson & Leavenworth

ATTORNEYS

Reissued Mar. 21, 1933 Re. 18,774

UNITED STATES PATENT OFFICE

CHRISTIAN WILHELM PAUL HEYLANDT, OF BERLIN-BRITZ, GERMANY, ASSIGNOR TO FLÜGA AKTIENGESELLSCHAFT, OF ST. MORITZ, SWITZERLAND, A CORPORATION OF SWITZERLAND

TRANSFERRING LIQUEFIED GASES

Original No. 1,786,159, dated December 23, 1930, Serial No. 338,653, filed February 9, 1929, and in Germany February 16, 1928. Application for reissue filed April 23, 1932. Serial No. 607,208.

The present invention relates to method and apparatus for supplying gas of low boiling point at predetermined desired pressures, and has for its object generally a procedure for producing and utilizing gases, such as are employed in the industrial field, in an economical and expeditious manner at relatively small cost and with relatively little waste.

More specifically, the invention relates to the manner of supplying and utilizing in the industrial field, such gases as oxygen, nitrogen, hydrogen, methane, and the like, whereby they may be produced in the liquid phase in large central plants from which they are transported while still in the liquid phase and distributed to the places where they are to be used.

Specifically, it is an object of the invention to provide a method and apparatus which makes practicable the construction of liquefied gas producing plants on a scale where relatively large economies may be practiced and are adapted to service relatively large areas utilizing such gases, whereby the small unremunerative plants may be eliminated.

It is also an object to provide a procedure and suitable equipment for generating gas of a desired pressure from gas material in the liquid phase at the place of use, in order to eliminate the unproductive handling of the cylinders heretofore employed for transporting compressed gases, and to do away with other heavy equipment incident to the use and transportation of gas in such cylinders.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the application of which will be indicated in the claims.

Figure 1:
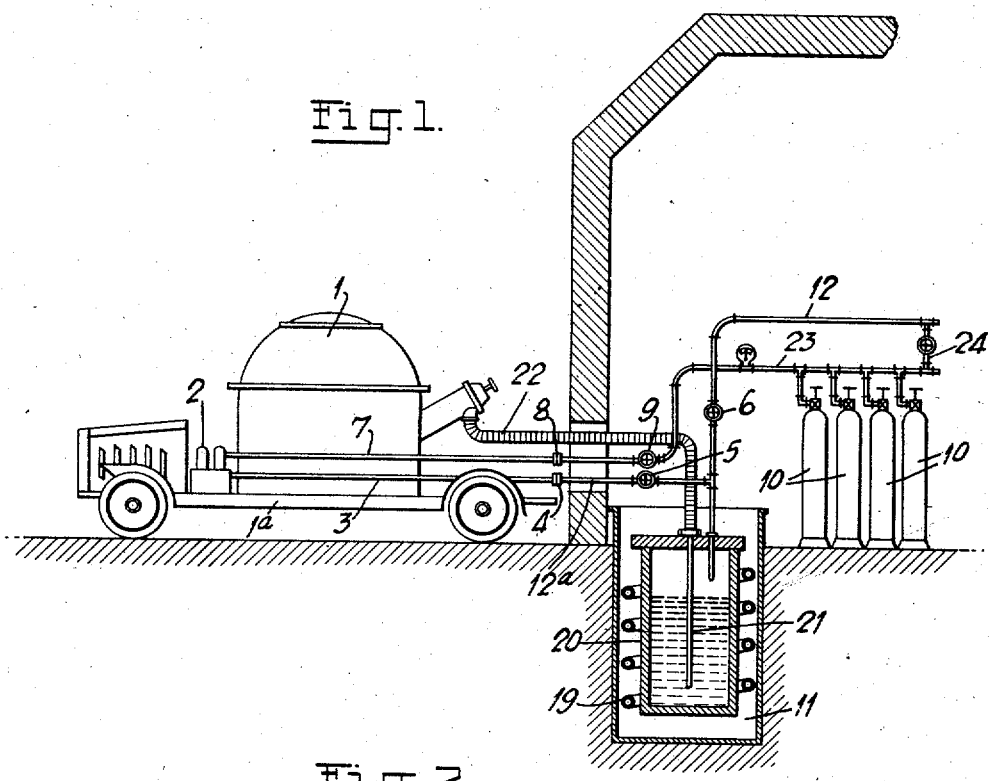
Figure 2:
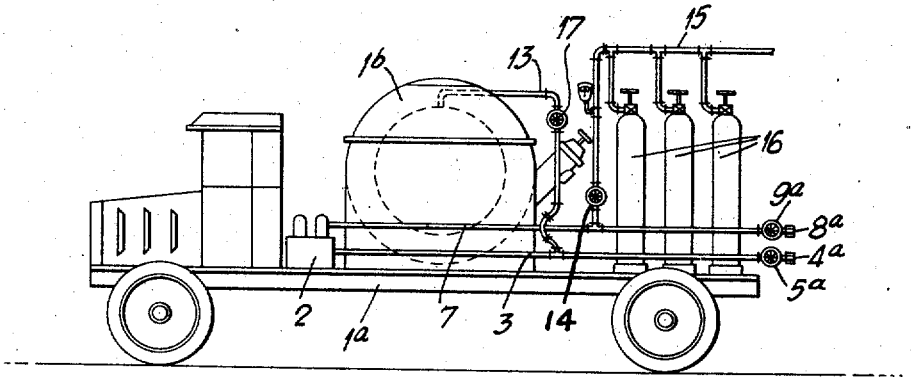

For a fuller understanding of the nature and objects of the invention reference should be had to the following detailed description taken in connection with the accompanying drawing, in which:

Fig. 1 is a view partly in section and partly in elevation showing diagrammatically an arrangement of apparatus constructed in accordance with the invention; and Fig. 2 is an elevational view showing a modified form of apparatus.

Gases, that in the liquid phase have low boiling points, for example oxygen, nitrogen, hydrogen, methane, and the like, when prepared for industrial purposes, have commonly been compressed into steel cylinders at the place of production and from there shipped to the places of consumption located at a distance, or they may have been conducted there in pipe lines. Both of these methods of supply are costly, because the average weight of steel cylinders capable of taking only 0.5 kgs. of hydrogen or 8 kgs. of oxygen is about 75 kgs. each, and of course the laying of pipe lines is expensive. The same conditions prevail in connection with the shipping of other similar gases.

More favorable results are obtained, if the gases are first liquefied and then transported in segregated bodies while in the liquid phase.

The purpose of economy will be still further served if the gases, conveyed to the place of consumption in the liquid phase, are initially compressed at the place of use in suitable devices, by self-compression, to the desired pressure, for example, to a pressure of 150 atm. or more.

In this connection difficulties, however, are encountered inasmuch as in the conveying of the liquefied gas from the vessel in which it is transported into the high pressure gasifying device there are present certain unavoidable losses due to the transfer. Furthermore, the use of high pressure gasifying devices together with the low temperatures occurring in the evaporation process and in particular in connection with the production of very high pressures, does not meet present day requirements. It has been found that these difficulties can be eliminated by bringing the gases, after being transported in the liquid phase to the desired pressure at the place of consumption, by mechanical means, whereby the advantages of transportation in the liquid phase are fully utilized while losses occurring during the transfer are substantially avoided.

The process of the present invention involves the practice of a series of steps partly already known. The particular sequence here practiced however results in material savings in the cost of industrial gases to consumers, for example, in certain cases this savings amounts approximately to one half the cost of supplying compressed gas by either of the present methods mentioned above. On account of the difficulties in liquefying industrial gases of low boiling point, such as the constituents of coke-oven gases, oxygen, or nitrogen, there is a certain range of operation where the advantages are evident for one can readily figure how much greater is the area that can be serviced with gas by the present invention with a given capital investment in comparison with servicing by pipe-lines or by the use of cylinders.

The producer factories can therefore be maintained as large plants; the saving on account of this measure being a substantial percentage of the present manufacturing costs. As a further advantage there must be taken into account the considerable reduction of the costs in connection with shipments also for large distances. In the practice of the present invention, the shipping costs are approximately 15 per cent. of the costs resulting from shipment of the gases in steel cylinders. A further advantage is the delivery of the liquefied gases to the consumer with substantially no loss, for the reason that all evaporation losses during the emptying and transfer period and during operation are substantially avoided by providing for the mechanical compression of such evaporation products. In this connection it is important that the mechanical compression be carried out not at the place of production but at the place of consumption.

Finally the process can be carried out in such a manner that a part of the liquefied gas is carried directly from a low pressure container to the place of consumption, by transferring to a high pressure device for automatic gasification and high pressure compression, while the other part, i. e. the arising so-called waste gases, by means of mechanical compression work, are brought to such a high pressure as can only be obtained with great difficulty by self-compression for practical reasons.

In Fig. 1 of the drawing, 1 designates a container adapted to hold a charge of liquefied gas, the container being shown as mounted on a motor truck 1[a] for transport service. On the truck is also mounted a compressor 2, which may be operated by power from the truck motor. Communicating with said compressor are a pair of pipe lines 3 and 7, which may be formed of pressure hose and provided with connections 4 and 8 respectively. At the place of consumption is constructed a chamber 11 in which is disposed a vaporizer or evaporating vessel 20, having a warming means 19, for example a water heating coil, and a filling tube 21 that communicates with a liquid discharge conduit 22, leading from the outlet from the transport container 1. The vaporizing device 20 has a gas outlet pipe line 12 provided with a valve 6 for controlling the flow of gas to a consuming device, said pipe line having a branch 12[a] which communicates with the main pipe 12 at a point between the valve 6 and the vessel 20, said branch being provided with a valve 5 and having a connection at its free end adapted to be coupled with the connection 4 of the pipe 3. At the place of consumption there are preferably provided a plurality of steel cylinders 10, each in communication with a pipe line 23 provided with a valved by-pass 24 and a valve 9 and having at its free end a connection adapted to be coupled with the connection 8 of the pipe line 7.

With the apparatus above described, the storage and supply cylinders 10 or other consuming devices are supplied with gas at a desired high pressure by transferring the gas material in the liquid phase from container 1 to the vaporizing device 20 in chamber 11. After the transfer to the latter device, the liquid is warmed and vaporized to produce gas which compresses itself to a high pressure. Upon opening the valve 6 and that at 24 the gas flows into and charges the cylinders to the required pressure. After the pressure gas has passed from the vessel 20, the valve 6 and that at 24 are closed and valves 5 and 9 opened, whereupon the residue of the gas remaining in the vessel 20 which is at too low a pressure to flow into the cylinders 10, may be drawn off by the pump 2 and forced into one or more cylinders at the required pressure. This operation takes place prior to the introduction of a fresh charge of liquid into the vessel 20. In this manner, the gas remaining in vessel 20 after each operation, instead of being lost as heretofore, is compressed mechanically and may be forced into a cylinder at 10 or into a low-pressure receptacle ready for consumption when required.

In the modification illustrated in Fig. 2, the liquefied gas container 1[b] is shown mounted on the truck 1[a], together with the compressor 2 and a plurality of stationary vessels 16. The compressor 2 in this instance is arranged to communicate with the upper portion of the liquefied gas container by means of pipes 3 and 13, the latter being provided with a valve 17, in order that the gas evolved in transit may be recompressed to a desired pressure and then passed through the pipe 7 to the stationary storage vessels 16. The valves 5ᵃ and 9ᵃ, as well as the pipe connections 4ᵃ and 8ᵃ carried by the pipes 3 and 7 are in this instance disposed at the outer ends of said pipes, the vessels 16 communicating with the pipe line 7 by way of a pipe 15 provided with a valve 14. By means of this construction, compressed gas can be supplied directly from the truck to the consumer.

The expenditure of work for such a compressor which in such event has to compress gas of about 75 ats. to 150 ats. is relatively small. In order to compress gas at the rate of about 100 cubic meters per hour, requires only about 2 H. P. In the latter case, the revolving compressor is arranged at the place of consumption.

In this manner, liquefied gases can be stored for relatively long periods of time without any substantial losses so that in a period of non-consumption the resulting evaporation products are brought, by mechanical compression means, into suitable pressure containers at the place of consumption, in this way avoiding a loss of gas to the outside.

Having described my invention, what I claim as new and desire to secure by Letters Patent, is:

1. The method of supplying a low boiling point gas at predetermined pressure, which comprises charging a transport container with a charge of liquefied gas where it is maintained at relatively low pressure when transported, thereafter transferring liquefied gas from said container to a second vessel, vaporizing the transferred liquefied gas to cause the same to generate gas at a relatively high pressure by self-compression, and discharging said compressed gas to a consuming device at the desired pressure.

2. The method of supplying oxygen gas at predetermined pressure, which comprises charging a thermally insulated transport container with liquid oxygen where it is maintained at relatively low pressure and without substantial evaporation when transported, thereafter transferring liquid oxygen from said container to a second vessel, vaporizing the transferred liquid to cause the same to generate gas at a relatively high pressure by self-compression, and supplying consuming devices with said compressed gas at the desired pressure.

3. The method of supplying oxygen gas at predetermined pressure, which comprises charging a thermally insulated transport container with liquid oxygen where it is maintained at relatively low pressure and without substantial evaporation when transported, thereafter transferring liquid oxygen from said container to a second vessel, vaporizing the transferred liquid to cause the same to generate gas at a relatively high pressure by self-compression, discharging said compressed gas to a consuming device until the pressure in said second vessel is reduced, and mechanically compressing residue gas externally of said second vessel whereby it may be supplied to a consuming device at the desired pressure.

4. The method of supplying oxygen gas at predetermined pressure, which comprises charging a thermally insulated transport container with liquid oxygen where it is maintained at relatively low pressure and without substantial evaporation when transported, thereafter transferring liquid oxygen from said container to a closed vaporizer, supplying heat to said vaporizer to cause the transferred liquid to be converted into gas at a relatively high pressure by self-compression, storing portions of said compressed gas at a desired pressure, discharging compressed gas to a consuming device when desired, withdrawing gas from said container to reduce the vapor pressure therein, mechanically compressing the same, and storing the compressed gas at the desired pressure.

5. The method of supplying oxygen gas for industrial consumption under pressure, which comprises charging a thermally insulated transport container with liquid oxygen where it is maintained at relatively low pressure and without substantial evaporation loss during transport, subsequently transferring liquid oxygen from said container to a closed vaporizer, supplying heat to vaporize the liquid oxygen and cause the same to generate gaseous oxygen at a relatively high pressure, and delivering said gaseous oxygen to a consuming device under pressure.

6. The process of supplying gas of low boiling point at a predetermined pressure, which consists in charging a closed vessel with liquefied gas, vaporizing the liquid in said vessel and causing the major portion of the gas to flow therefrom at the desired pressure, and mechanically drawing off the residue from said vessel and compressing it to the required pressure.

7. The process of supplying gas of low boiling point at a predetermined pressure, which consists in charging a closed vessel with liquefied gas, vaporizing the liquid in said vessel and causing the major portion of the gas to be self-compressed and to flow from said vessel at the required pressure, and pumping the residue from said vessel and forcing it at the desired pressure into a pressure container.

8. Apparatus for supplying gas at a predetermined desired pressure, which comprises an evaporating vessel arranged to receive a charge of liquefied gas from a liquefied gas container, means for warming said vessel whereby the liquid therein is evaporated and gas provided at a high pressure, means for closing the same to the atmosphere, a gas withdrawal connection communicating with said vessel arranged to service a consuming device, said connection having a portion provided with a gas receiving cylinder, and a second gas withdrawal connection leading from said vessel having an associated compressor and arranged to discharge to said cylinder supply portion of the first said connection.

9. Apparatus for supplying oxygen gas at a predetermined desired pressure, which comprises a portable liquid oxygen container, a portable compressor, a stationary evaporating vessel, means for establishing communication between said container and vessel for delivering liquid oxygen into the latter adjacent the lower portion thereof, means for automatically delivering the major portion of the oxygen vaporized in said vessel at a desired pressure, and communicating means between said compressor and said vessel for withdrawing the residue from said vessel and compressing the same.

10. Apparatus for supplying gas at predetermined pressure, which comprises a thick-walled evaporating vessel provided with a separable cover adapted to seal the same against the atmosphere, means located externally for warming said vessel, means associated with said vessel for introducing a charge of liquefied gas, said last mentioned means having a portion adapted to establish detachable communication with a liquefied gas container when supplying said charge, gas withdrawal connections associated with said vessel whereby the gas evolved within said vessel may be withdrawn as desired, and a consuming device supplied by said connections.

11. Apparatus for supplying gas at predetermined pressure, which comprises a thick-walled evaporating vessel provided with a separable cover adapted to seal the same against the atmosphere, means located externally for warming said vessel, means associated with said vessel for introducing a charge of liquefied gas, said last mentioned means having a portion adapted to establish detachable communication with a liquefied gas container when supplying said charge, gas withdrawal connections leading from said vessel including branches, one branch leading directly to a consuming device, and a gas storage device connected to a second branch whereby gas evolved in said vessel may be directed to a consuming device or be received and stored at a desired pressure in said storage device.

In testimony whereof I affix my signature.

CHRISTIAN WILHELM PAUL HEYLANDT.